United States Patent

Sollman et al.

[15] 3,697,977

[45] Oct. 10, 1972

[54] TWO PHASE ENCODER SYSTEM FOR THREE FREQUENCY MODULATION

[72] Inventors: George H. Sollman, Cambridge; Samuel J. Dixon, Holliston, both of Mass.

[73] Assignee: Honeywell Inc., Minneapolis, Minn.

[22] Filed: July 6, 1970

[21] Appl. No.: 52,328

[52] U.S. Cl. ..................340/347 DD, 325/38, 178/66

[51] Int. Cl. ..................H04l 3/00

[58] Field of Search .340/347 DD, 174.1 H, 174.1 G; 328/55, 63; 178/66, 67, 68; 325/38

[56] References Cited

UNITED STATES PATENTS

| | | | |
|---|---|---|---|
| 3,422,425 | 1/1969 | Vallee | 340/347 DD |
| 3,414,894 | 12/1968 | Jacoby | 340/347 DD |
| 3,500,385 | 3/1970 | Padalino et al. | 340/347 DD |

*Primary Examiner*—Maynard R. Wilbur
*Assistant Examiner*—Jeremiah Glassman
*Attorney*—Fred Jacon and Leo Stanger

[57] ABSTRACT

A multiphase encoder translates the bits of a Non-Return-to-Zero digital signal into a three frequency self-clocking having a data transition at the center of a binary ONE bit and a data transition between successive binary ZERO bits.

15 Claims, 3 Drawing Figures

INVENTORS
GEORGE H. SOLLMAN
SAMUEL J. DIXON
BY Faith F. Driscoll
ATTORNEY

INVENTORS
GEORGE H. SOLLMAN
SAMUEL J. DIXON
BY
Faith F. Driscoll
ATTORNEY

TWO PHASE ENCODER SYSTEM FOR THREE FREQUENCY MODULATION

RELATED APPLICATIONS

"An improved Two Phase Encoder System for Three Frequency Modulation" invented by George H. Sollman, filed on even date with this application, Ser. No. 52,327 and assigned to the same assignee named herein.

"A Four Phase Encoder System for Three Frequency Modulation" invented by George H. Sollman and Samuel J. Dixon, filed on even date with this application, Ser. No. 52,313 and also assigned to the same assignee named herein.

BACKGROUND OF THE INVENTION

Field of the Invention

This invention relates to digital encoding systems and more particularly to encoding systems for use in magnetic recording systems.

Discussion of the Prior Art

Numerous encoding schemes have been developed for recording digital information on a magnetic medium at high densities. One such scheme involves an encoding technique which introduces few transitions in the context of the information involved.

In greater detail, the above technique never introduces any more than one transition per information bit and at least a transition once every two information bits. The rules for this encoding are:

1. A flux reversal occurs in the center of every bit cell (i.e. time interval defining a bit) containing a binary ONE and,
2. A flux reversal occurs between two adjacent bit cells containing binary ZEROS.

Because of the characteristics of the self-clocking waveform (i.e. the three possible time periods) which result from applying the above rules of encoding, this waveform is termed a three frequency encoded waveform herein.

Prior art encoder systems in general implement these encoding rules with delay devices in the The storage of monostable multivibrators, delay lines, RC timing circuits, etc. While the delay devices may in some instances reduce the number of storage devices required in some encoder systems, such devices are frequency sensitive. Hence, one disadvantage of these prior art systems is that the timing accuracy of the encoder can vary with changes in frequency and temperature. Furthermore, the range of tolerances of these delay devices create major problems in bit shift.

Another important disadvantage of other prior art encoders is that they introduce extra elements external to the circuit elements which make up the encoder system. This in turn increases the number of interconnections between circuit elements of the encoder. The result is that the cost of the encoder system increases significantly when the systems are reduced to integrated circuit form.

Additionally some prior art systems use a variety of different types of storage devices and logic gates. The storage devices used in many instances can be very costly. Thus, the foregoing also increases the cost, the amount of logic and non-uniformity.

OBJECTS

Accordingly, it is an object of this invention to provide an improved encoder system which generates a three-frequency self-clocking waveform without the use of frequency sensitive devices.

It is a more specific object of this invention to provide an encoder system which employs inexpensive storage devices and a multiphase clock having a minimum number of logic components for accurate generation of logic functions without measurable bit shift.

It is still a more specific object of this invention to provide an encoder which minimizes the number of circuit interconnections thereby making it well suited for integrated circuit construction at low cost.

SUMMARY OF THE INVENTION

The above and other objects are provided according to the basic concept of this invention through a two phase encoder logic arrangement which includes a two phase clock combined with two clocked flip-flops in series with a complementing output flip-flop.

In greater detail, the clock operates at 2N bits/sec. to synchronize it with an input bit data stream of N bits per second. The clock in an exemplary embodiment includes a flip-flop connected to complement, whose outputs are combined with logic gates to produce two phase outputs. One of the output phases clocks the bits of the data stream waveform from a data register into the encoder system. The same output phase is also connected to clock each of the flip-flops and gates internal to the encoder system.

In greater detail, the first flop-flop is clocked by one phase to store bits of the input data stream waveform which it delays by one bit time. Logic gates combine the output of the first flip-flop and the input data waveform and then gate the result or sum with the same phase signal into the second flip-flop which is in turn gated by the same phase signal to produce pulses representative of successive binary ZEROS in the input waveform. The output of the first flip-flop is also gated with the other phase signal to produce pulses representative of binary ONES in the input data stream waveform. The pulses representative of binary ONES and ZEROS are then gated into the output flip-flop which complements to produce the self-clocking three frequency encoded waveform.

Any overlapping between the clocking of bits of the data stream into the first and second flip-flops is eliminated by clocking the output sum of the data stream waveform and the output of the one flip-flop with the first phase signals. This arrangement gates out all the undesired pulses without regard to changes in the width of the input waveforms.

Since each of the flip-flops require no more than two inputs including common phase for clocking, less external and internal interconnections are required for the encoder system. Hence, the encoder system may be implemented in integrated circuit form at reduced cost.

The above and other objects of this invention are achieved in an illustrative embodiment described hereinafter. All features which are believed to be characteristic of the invention, both as to its organization and method of operation together with further objects and advantages thereof will be better understood from the following description considered in connection with the accompanying drawings. It is to be expressly understood, however, these drawings are for the purpose of illustration and description only and are not intended as a definition of the limits of the invention.

DESCRIPTION OF THE PREFERRED EMBODIMENT

Figure 1:
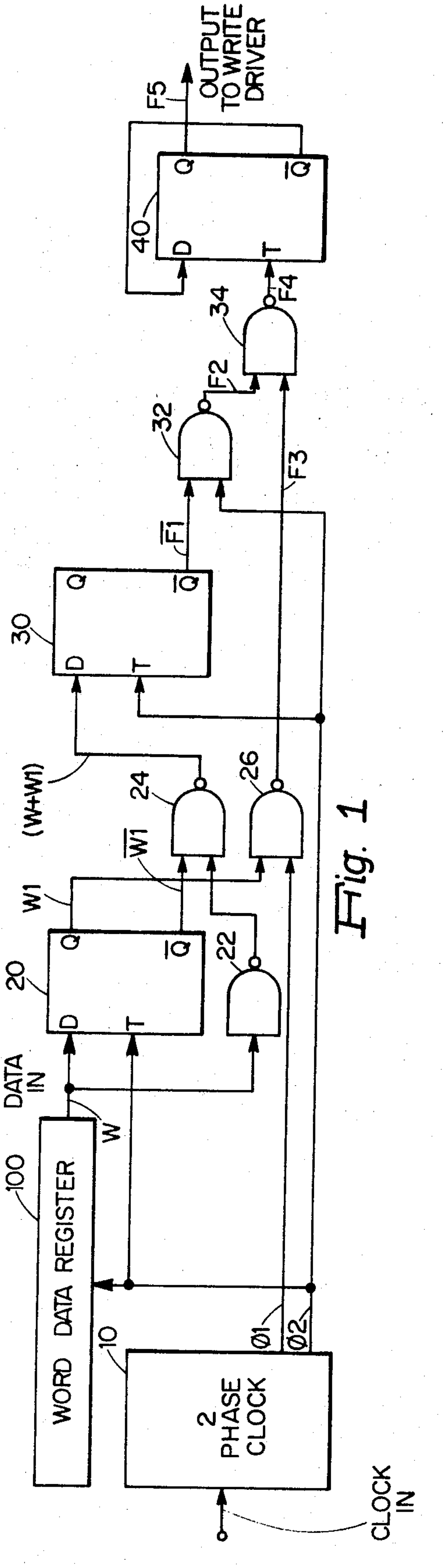
FIG. 1 shows in block diagram form, the encoder system of this invention.

Referring now to FIG. 1, the encoder system includes a two phase clock 10 operative to produce first and second phase outputs $\phi 1$ and $\phi 2$ respectively.

The phase output $\phi 2$ connects as a CLOCK input to a clocked word shift register 100 which provides temporary data storage for the information bits of the data stream waveform to be encoded.

Additionally, the phase output $\phi 2$ connects to the CLOCK input T of each of two clocked flip-flops 20 and 30 in addition to a gate 32 whose output feeds another gate 34. Each of the flip-flops 20 and 30 have a single DATA input, D. The input D of flip-flop 20 receives the bits of the data stream waveform designated as W. The input D of flip-flop 30 receives the complement of the waveform W and the complement $\overline{W1}$ of the output W1 of flip-flop 20 via a gate 24.

For the purposes of this invention, a clocked flip-flop may be defined as one having two states, at least a single data input, a clock input, and complementary outputs. These outputs are designated as Q and $\overline{Q}$.

An example of a clocked flip-flop is the so-called D flip-flop which is described at page 126 of the text "Logical Design of Digital Computers" by M. Phister Jr., published in 1958 by John Wiley and Sons, Inc.

It will be noted that other types of two input flip-flops can be used and operated in a similar fashion. For example, an RST flip-flop can be changed into a D flip-flop by adding a NAND gate to the SET (S) input of the RST flip-flop and then tying the NAND gate input to the R input. Similarly, an equivalent change can be made to a JK flip-flop which converts it into a D flip-flop.

The logic state of the bit presented to the DATA input, D, of flip-flop 20 appears at the $\overline{Q}$ output after the occurrence of the clocking transition, one bit interval later. In the arrangement shown, flip-flops 20 and 30 switch at the leading edge of the $\phi 2$ pulses and produce respectively output waveforms W1, $\overline{W1}$ and F1.

In greater detail, the data stream waveform W is inverted by a gate 23 and then fed to a gate 24. Both gates in the illustrated embodiment are symbolically shown as NAND gates. As well-known in the art, a NAND gate produces an inverted AND function. Here, NAND gate 24 produces a waveform which represents the sum of waveforms W and W1. NAND gate 23 is adapted to perform as an inverter by either connecting both inputs together or typing the unused input to a voltage level representative of a logic ONE.

The output of NAND gate 24 is applied to the DATA input, D, of flip-flop 30. The flip-flop 30 when clocked by $\phi 2$ pulses produces at its outputs Q and $\overline{Q}$ respectively an output F1 which corresponds to the input waveform delayed by a bit interval and its complement $\overline{F1}$. A NAND gate 32 is enabled by output $\overline{F1}$ waveform, to pass $\phi 2$ pulses upon the occurrence of adjacent ZEROS. The NAND gate 32 produces an output F2 in accordance with the Boolean Expression:

$$F2 = \overline{\overline{F1}.\phi 2}. \qquad 1.$$

The output W1 is fed through NAND gate 26 which is clocked by $\phi 1$ pulses. The NAND gate 26 produces an output F3 in accordance with the Boolean expression:

$$F3 = \overline{W1 \cdot \phi 1} \qquad 2.$$

The above expressions assume that a binary ONE is defined as a high or positive voltage level and that a binary ZERO is defined either as ground or as a low voltage level.

A further NAND gate 34 feeds the outputs F2 and F3 of NAND gates 32 and 26 to complementing flip-flop 40. This flip-flop, as shown, may be a D flip-flop connected as shown to complement. The self-clocking three frequency output F5 is then fed to a driver circuit (not shown).

Figure 1A:
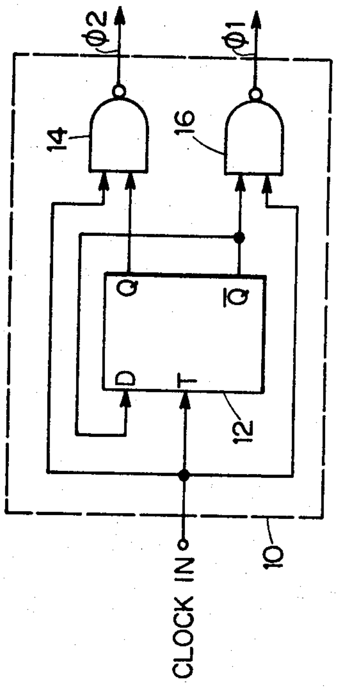
FIG. 1*a* shows in greater detail a preferred embodiment of a two phase clock of FIG. 1; and, FIG. 2 is a timing diagram showing a series of waveforms illustrating the relationship of signals in different portions of the encoder system of FIG. 1.

FIG. 1a shows a preferred embodiment of the two phase clock 10. The clock 10 includes a single complementing flip-flop 12 whose outputs Q and $\overline{Q}$ feed NAND gates 14 and 16 respectively. These gates as the flip-flop 12 are conditioned by pulses applied to a clocking line to produce $\phi 1$ and $\phi 2$ pulses having a 180° out-of-phase relationship to each other as shown in FIG. 2.

DESCRIPTION OF OPERATION

Figure 2:
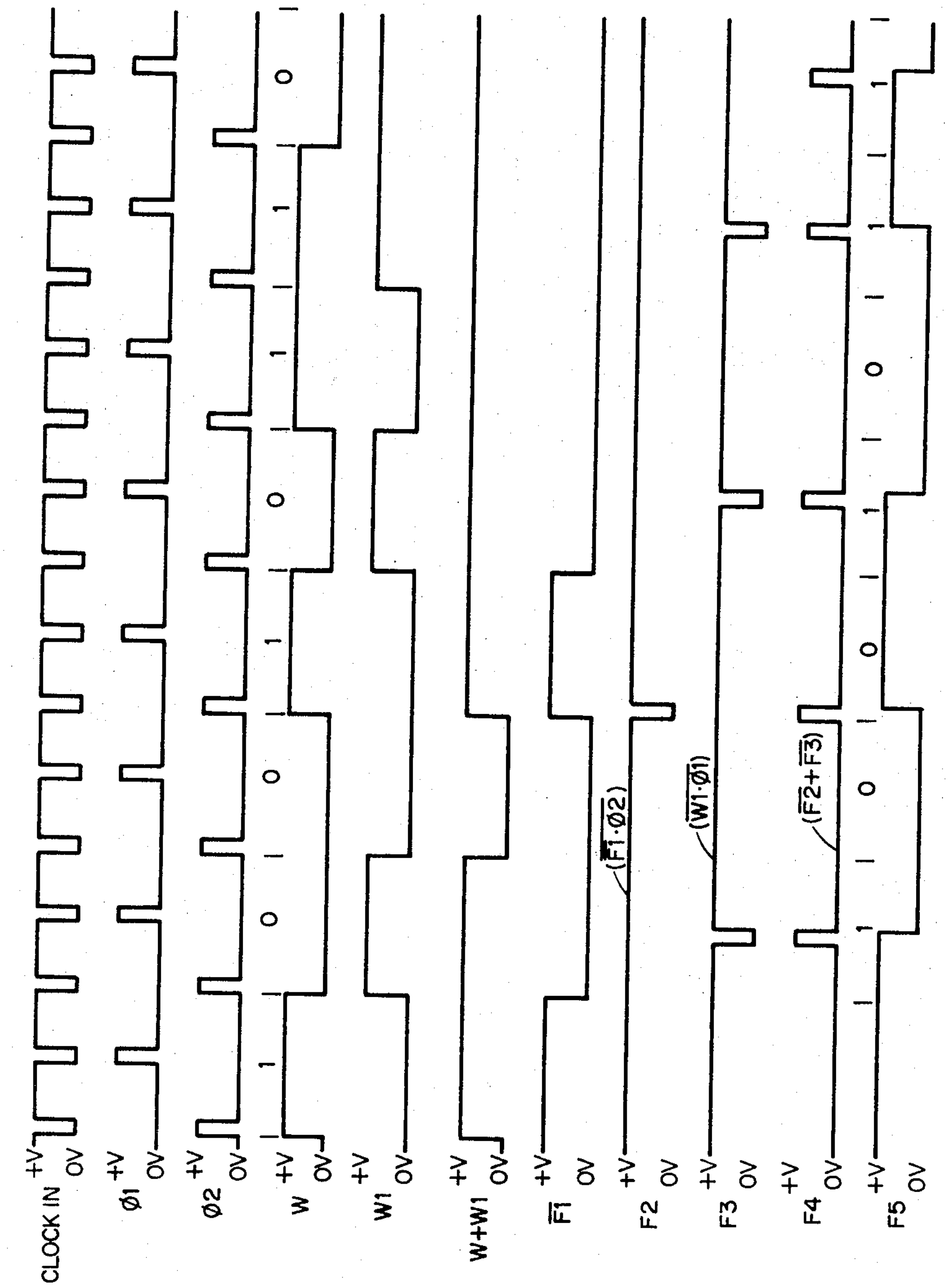

With reference to FIGS. 1 and 2, the operation of the encoder system of FIG. 1 will now be described. Now referring to FIG. 2, the data stream waveform W is shifted out of the data register 100 by applying $\phi 2$ pulses thereto. The bits of waveform W are applied to flip-flop 20. This non-return to zero (NRZ) waveform is coded to represent the binary information 10010110.

As shown, the pulses of the $\phi 1$ pulse train are such that the trailing edges (i.e. negative going transitions) occur at the centers at the information bits while the pulses of the $\phi 2$ pulse train occur at the boundaries or between bit intervals of the information bits.

The $\phi 2$ pulses applied to the clock input, T, condition flip-flop 20 to delay each of the information bits by a bit interval as shown by waveform W1 of FIG. 2.

When the NRZ waveform, W, has a binary ONE bit, flip-flop 20 is switched to its binary ONE state thereby producing a level representative of a binary ONE for waveform W1. When the W1 input is at a binary ONE level, it enables NAND gate 26 to pass positive going $\phi 1$ pulses as illustrated by waveform F3. However, when flip-flop 20 is switched to its binary ZERO state by a subsequent $\phi 2$ pulse, the W1 waveform assumes a binary ZERO level and inhibits NAND gate 26 from passing $\phi 1$ pulses as again illustrated by waveform F3. These pulses appearing at the output of NAND gate 26 are in turn fed through NAND gate 36 to output complementing flip-flop 40.

In summary, it is seen that when the input data stream waveform, W, has a binary ONE bit, NAND gate 26 is enabled at a bit interval later by the W1 output to pass $\phi 1$ pulses to the clock input T of the complementing flip-flop 40. It is to be noted that NAND gate 26 is only enabled in this manner when the binary ONE bit in the data stream waveform is followed by a binary ZERO bit. This is illustrated by waveforms W and F3.

When the NRZ waveform W has two successive binary ZERO bits, the output $\overline{F1}$ of flip-flop 30 whose state represents the occurrence of two adjacent zeros enables NAND gate 34 to pass $\phi 2$ pulses onto complementing flip-flop 40.

In greater detail, flip-flop 20 switches to a state which defines whether a previous bit interval contained a binary ONE or binary ZERO. Using the $\overline{W1}$ output of flip-flop 20 for a reference, NAND gate 24 applies an input to switch flip-flop 30 to a state which defines the occurrence of two adjacent binary ZEROS. It does this by gating the $\overline{W1}$ output with the inversion of the data stream waveform W. When there are two adjacent binary ZEROS, NAND gate 24 is enabled and its output which is defined by the logic sum W + W1 is applied to the data input D of flip-flop 30. Accordingly, flip-flop 30 when clocked by $\phi 2$ pulses, switches from a binary ONE to a binary ZERO state indicating the occurrence of two adjacent binary ZEROS. This is illustrated by the $\overline{F1}$ waveform of FIG. 2. Since both flip-flops are clocked by the same transitions of $\phi 2$ pulses, any pulse overlap which might otherwise occur is avoided.

The output $\overline{F1}$ of flip-flop 30 is gated with $\phi 2$ pulses enabling NAND gate 32 to pass $\phi 2$ pulses upon the occurrence of two adjacent ZEROS. This is illustrated by waveform F2 of FIG. 2.

The NAND gate 34, as illustrated by waveform F4, conditions output flip-flop 40 to change its state or complement by applying the pulse outputs of NAND gates 26 and 34 to its CLOCK input. For raceless operation, flip-flop 40 as illustrated by waveform F5 is arranged to switch state at the trailing edge of the pulses supplied by gates 26 and 34. It will be appreciated that flip-flop 40 can be also adapted to switch state on the leading edge (i.e. positive going transition) of each pulse.

The "ONE" transition occurs at the centers of the bit intervals for each one bit in the input waveform W. The "ZERO" transitions only occur at the boundary between two successive binary ZEROS in the input waveform W. Hence, the output waveform F5 is encoded so that a transition of the center of a bit time represents a binary ONE and the absence of a transition at the center represents a binary ZERO. As previously mentioned, the waveform F5 is well suited for recording digital information on a magnetic medium at high densities.

An improved two phase encoder system which utilizes an arrangement particularly designed for integrated circuit construction has been disclosed. The encoder system uses flip-flops which require a limited number of inputs which includes a common clock input. This reduces the number of external and internal interconnections within the encoder system making it more suitable for integrated circuit construction.

Additionally, the same type of gates and flip-flops are used which also reduces integrated circuit costs. For example, each of the flip-flops and gates may be implemented using MOS logic such as described in an article titled "MOSS Complex Array System Design" by L. L. Boysel and G. P. Carter appearing in the Feb., 1969 issue of the publication titled Electro-Technology.

It will be appreciated that changes can be made to the illustrated embodiment without departing from the invention. For example, equivalent types of flip-flops having a limited number of inputs may be substituted for the D flip-flops as previously mentioned. For this purpose, the text by Phister previously mentioned may be consulted.

While in accordance with the provisions and statutes, there has been illustrated and described the best form of the invention known, certain changes may be made in the circuits described without departing from the spirit of the invention as set forth in the appended claims and that in some cases, certain features of the invention may be used to advantage without a corresponding use of other features.

Having described the invention, what is claimed as new and novel for which it is desired to secure Letters Patent is:

1. An encoder for translating bits of a NRZ data input signal into a self-clocking waveform comprising:

a two phase clock for generating pulses of first and second phase signals having 180° out-of-phase relationship to one another in response to an input clock waveform;

means for synchronizing the timing of said NRZ data signal with a predetermined phase signal of said clock so that the pulses of said first phase signal occur within the center of said bits and the pulses of said second phase signal occur at boundaries between bits;

a first clocked flip-flop having a CLOCK input for receiving said pulses of said second phase signal and a DATA input for receiving said NRZ signal, said flip-flop being conditioned by pulses of said second phase signal and said NRZ signal to produce a first data signal and its complement, each delayed from said NRZ signal by one bit time;

a second clocked flip-flop having a CLOCK input for receiving said pulses of said second phase signal and a DATA input, said flip-flop including gating means for receiving said complement of said first data signal and the complement of said NRZ signal and being connected to apply an output signal to said DATA input, said second flip-flop being conditioned by pulses of said second phase signal to generate a second data signal and its complement in accordance with said output signal corresponding to the sum of said first data signal and said NRZ signal;

first gating means for receiving the complement of said second data signal and pulses of said second phase signal, said first gating means being conditioned to pass pulses of said second phase signal when said complement of said second data signal is in a state representative of the occurrence of successive ZERO bits in said NRZ signal;

second gating means for receiving said first data signal and said pulses of said first phase signal, said second gating means being conditioned to pass pulses of said first phase signal when said first data signal is in a state representative of the occurrence of a binary ONE bit in said NRZ signal;

third gating means coupled to first and second gating means; and, complementing bistable means coupled to said third gating means and being conditioned by said pulses of said first and second phase signals to produce as an output said self-clocking waveform having transitions at the center of a binary ONE bit and at the boundaries between successive binary ZERO bits.

2. The encoder of claim 1 wherein said flip-flops are of the D type.

3. The encoder of claim 1 wherein said gating means are NAND gates.

4. The encoder of claim 1 wherein said synchronizing means includes a data shift register connected to receive said pulses of said second phase signal and said register being conditioned by said pulses to apply the bits of said NRZ signal to said first flip-flop so as to establish a predetermined phase relationship between said bits and the pulses of each of said phase signals.

5. The encoder of claim 1 wherein said two phase clock includes a complementing bistable storage device connected to receive said input clock waveform and being operative in response to said input clock waveform to generate a pair of complementary outputs; first and second gates, each gate being coupled to receive said clock waveform and a different one of said complementary outputs, said first and second gates respectively being conditioned by said clock waveform and said different one of said outputs to generate said first and second phase signals.

6. The encoder of claim 5 wherein said bistable device is a D type flip-flop and said gates are NAND gates.

7. An encoder for translating the bits of a NRZ data waveform into a self clocking three frequency waveform using a first phase signal having pulses which occur only at the center of the bit intervals of said NRZ waveform and a second phase signal having pulses which occur only at the boundaries of said bit intervals, said encoder comprising:

a first clocked bistable storage device and a second clocked bistable storage device, each of said devices having a CLOCK input for receiving pulses of said second signal, and a DATA input for receiving an input data waveform, each clocked device being conditioned by said pulses of said second phase signal to produce a pair of complementary outputs, each pair of outputs being delayed by one bit interval relative to said input data waveform, the DATA input of said first bistable storage device being connected to receive said NRZ waveform as said input data waveform and said second storage device including input gating means connected to receive a predetermined one of the outputs of said first storage device and the complement of said NRZ waveform and being operative to apply as an output said input data waveform to the DATA input of said second bistable device storage;

first gating means for receiving a predetermined one of the outputs of said second bistable device and pulses of said second phase signal, said first gating means being conditioned to pass pulses of said second phase signal when said predetermined one of said outputs is in a state representative of the occurrence of successive ZERO bits in said NRZ waveform;

second gating means for receiving the other of said outputs of said first bistable storage device and the pulses of said first phase signal, said gating means being conditioned to pass pulses of said first phase signal when said other output is in a state representative of the occurrence of a binary ONE bit in said NRZ waveform;

third gating means coupled to said first and second gating means for receiving pulses of said first and second phase signals; and, a complementing output flip-flop coupled to said third gating means and being conditioned by said pulses of said first and second phase signals to produce said self-clocking three frequency waveform having transitions at the center of each binary ONE bit and at the boundaries between successive binary ZERO bits.

8. The encoder of claim 7 wherein said bistable storage devices are D type flip-flops.

9. The encoder of claim 7 wherein each of said gating means include NAND gates.

10. An improved encoder for translating bits of a data stream waveform W into a self-clocking waveform comprising:

a two phase clock generator for generating pulses of first and second phases $\phi 1$ and $\phi 2$ in response to a clock input signal so as to have the $\phi 1$ pulses coincide with the centers of said bits and the $\phi 2$ pulses coincide with the boundaries of said bits;

a first clocked flip-flop including a CLOCK input for receiving said $\phi 2$ pulses and a DATA input for receiving said data waveform W, said first flip-flop being conditioned by said $\phi 2$ pulses, to switch state in accordance with said waveform W to produce a waveform W1 and its complement, $\overline{W1}$, each delayed by a bit interval relative to said waveform W;

a first gate connected to receive the complement waveform $\overline{W1}$ and the complement of said waveform W, said first gate being enabled to produce a data signal in accordance with the expression: $W1+W$;

a second clocked flip-flop including a CLOCK input for receiving said $\phi 2$ pulses and a DATA input for receiving said data signal, said second flip-flop being conditioned by said $\phi 2$ pulses to switch state in accordance with said data signal to produce a waveform $\overline{F1}$ whose state represents the occurrence of two adjacent ZERO bits in said waveform W;

a second gate connected to receive said waveform $\overline{F1}$ and said $\phi 2$ pulses, said gate being enabled to produce a pulse output F2 defined by the relationship: $F2=\overline{\overline{F1}\cdot\phi 2}$;

a third gate connected to receive said complement waveform $\overline{W1}$ and said $\phi 1$ pulses, said gate being enabled to produce a pulse output F3 defined by the relationship: $F3=\overline{\overline{W1}\cdot\phi 1}$; and, a complementing output flip-flop including a gate connected to said second and third gates, said gate being arranged to apply a complementing pulse signal F4 in accordance with the expression: $F4 = \overline{F2}+\overline{F3}$, said flip-flop being conditioned by said signal F4 to switch state during a bit interval of said data stream waveform W when there is a ONE and between bit intervals when there are two successive ZEROS.

11. The encoder of claim 10 wherein said flip-flops are of the D type.

12. The encoder of claim 10 wherein said gates are NAND gates and said complementing output flip-flop is arranged to switch state at the trailing edge of said pulse signal F4.

13. The encoder of claim 10 further including a data shift register connected to receive said $\phi 2$ pulses and being conditioned to apply the bits of said data waveform to said DATA input of said first flip-flop so as to establish the relationship between said bits and said $\phi 1$ and $\phi 2$ pulses.

14. The encoder of claim 10 wherein said two phase clock generator includes a complementing flip-flop connected to generate a pair of complementing outputs from said clock input and first and second gates connected to receive said clock input and a different one of said complementing outputs, said first and second gates being conditioned to generate said $\phi 1$ and $\phi 2$ pulses.

15. The encoder of claim 14 wherein said flip-flop is of the D type and said gates are NAND gates.

* * * * *